July 9, 1968     F. L. CUNEO, JR     3,392,039
LITHIUM SILICATE COMPOSITION
Filed Dec. 17, 1964
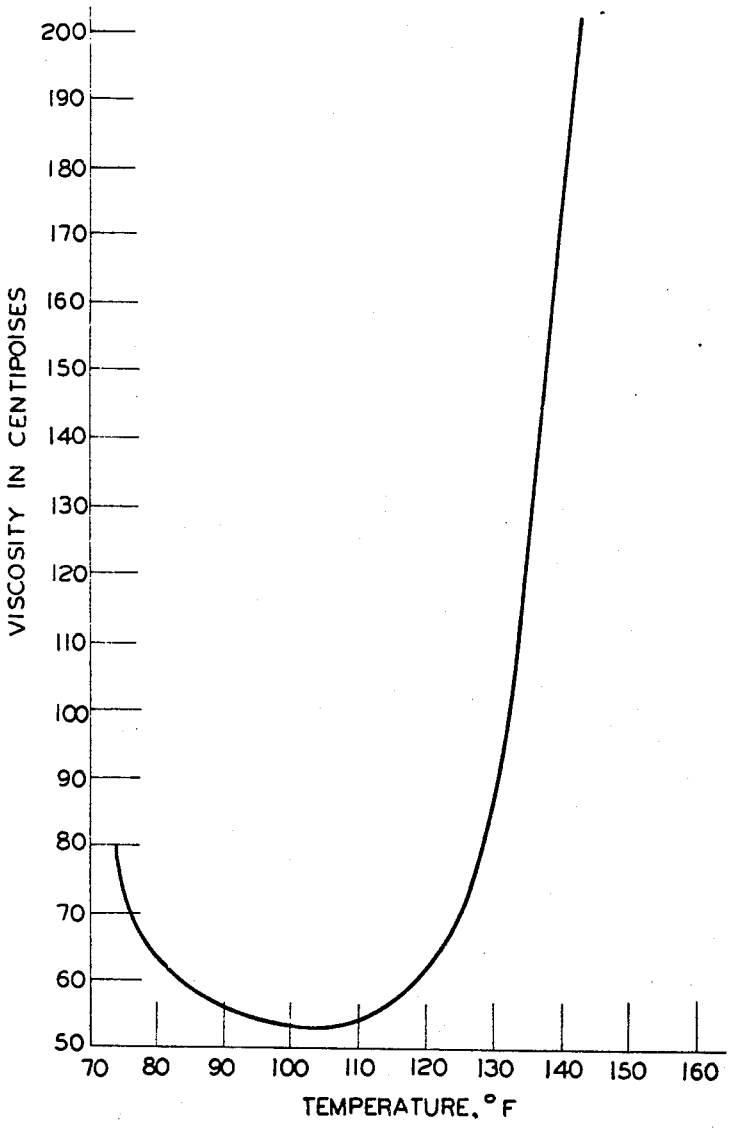

United States Patent Office 3,392,039
Patented July 9, 1968

3,392,039
LITHIUM SILICATE COMPOSITION
Frank L. Cuneo, Jr., San Lorenzo, Calif., assignor to Philadelphia Quartz Company of California, Berkeley, Calif., a corporation of California
Filed Dec. 17, 1964, Ser. No. 419,165
7 Claims. (Cl. 106—84)

ABSTRACT OF THE DISCLOSURE

A crystalloidal solution of lithium silicate in the ratio range of 1 $SiO_2$:1 $Li_2O$ to 8 $SiO_2$:1 $Li_2O$ is prepared by evaporation and/or heating at about the minimum in the viscosity-temperature curve of the solution.

---

I have found a process for preparing crystalloidal solutions of lithium silicate having commercial concentrations of silica. These solutions of lithium waterglass may have ratios above about 1 $SiO_2$:1 $Li_2O$ to about 8 $SiO_2$:1 $Li_2O$ and may be concentrated by evaporation to clear solutions at about 36° Baumé at the lower ratios and about 15° at the higher ratios with the $SiO_2$ present almost entirely or principally in a crystalloidal form with any colloidal particles present having a maximum of 2 m$\mu$. These concentrated solutions have reversed viscosity-temperature curves. When heated to temperatures above about 185° F., there is a separation from these solutions of solids which usually appear to be a form of lithium disilicate. However, on cooling, this precipitate usually redissolves. The actual temperature at which separation at which separation occurs will be lower the higher the concentration and the lower the ratio.

Background

For perhaps 100 years attempts have been made to prepare usefully concentrated solutions of lithium silicate (i.e., lithium waterglass). In more recent years there has been an insistent demand for such solutions as they were expected to have desirable properties in coatings, adhesives and as humectants.

Unfortunately, lithium alkali metal silicates have considerably different solubility relationships than do the other alkali metal silicates, such as sodium, potassium, cesium and rubidium. The lithium metasilicates and disilicates are quite insoluble and are similar to the alkaline earth metal silicates in this regard.

Attempts to prepare the lithium waterglass solutions from lithium silicate glass over the same range prepared by the usual melting technique have always failed. This may be because the alkali tends to dissolve first but in any case an insoluble lithium metasilicate or disilicate precipitates. Attempts to dissolve these glasses at high temperature were even less successful since the salts are less soluble at higher temperatures.

It has been suggested to dissolve some form of silica in lithium hydroxide but attempts of this type have failed because the solutions were dilute and could not be concentrated to commercial concentrations without the precipitation of the insoluble lithium silicates. Only very dilute solutions or hydrated solids have been reported at ratios not higher than 2.3 $SiO_2$:1 $Li_2O$ according to Vail, "Soluble Silicates," vol. I, page 130, Reinhold Publishing Co., New York (1952). Liquid compositions of $SiO_2$ and lithium hydroxide at higher ratios and concentrations are all colloidal compositions formed either by stabilizing silica sols having particle sizes greater than about 2 millimicrons, or peptizing silca sols or gels by the addition of lithium hydroxide according to Iler, U.S. Patent 2,668,149 and Bird, U.S. Patent 2,244,325. Vesterberg prepared a sol at 3.4 $SiO_2$:1 $Li_2O$ and 18.5% solids by cold peptization of a hydrous gel. McMahon et al., U.S. Patent 3,130,061 adds lithium hydroxide to an already stabilized sol.

Iler suggests the use of very pure silica sols. To these he adds lithium hydroxide at room temperature and forms a gel which then redisperses on standing, if the ratio is in the range of about 4 $SiO_2$:1 $Li_2O$ to about 25 $SiO_2$:1 $Li_2O$.

The art of zinc-increased coatings refers to lithium silicate solutions as useful but, lacking my invention, there has been no such solution available. The stabilized sols of colloidal silica which contain little or no crystalloidal silica are thus differentiated from my lithium silicate solutions which contain silica principally or entirely in the crystalloidal form. In the sols the silica is always present as particles larger than 2 m$\mu$ and usually larger than 15 m$\mu$ in order to obtain reasonable stability. Drummond, in U.S. Patent 2,765,237, for instance, refers to lithium silicate as a waterglass but does not specify any ratio. For sodium silicate he does suggest a ratio as high as 6 which can be prepared only at very low concentrations, if at all. There have been no commercial lithium silicate waterglasses and the reference by Drummond can only refer to the products of Vesterberg or Ordway. Coatings prepared with my crystalloidal silicates have properties significantly better than those using colloidal silicates.

My process

I have now found that I can prepare true crystalloidal solutions of lithium silicate at molecular ratios above about 1 $SiO_2$:1 $Li_2O$ to about 8:1 by mixing somewhat dilute suspensions of silica as gel, precipitated pigment or deionized sol with lithium hydroxide in the desired proportions of about 1 $SiO_2$:1 $Li_2O$, or higher, and by evaporation under carefully controlled conditions I can change the initially colloidal system over to crystalloidal waterglass. During the evaporation at higher temperatures a precipitate may form, and at ratios above about 2.5 this material will redissolve. Also, in the mixing of the lithium hydroxide slurry with the gel there appears to be a reaction involving the formation of a precipitate which dissolves in the high ratio solution, and the final solution is clear both before and after evaporation to commercial concentrations. Iler, on the other hand, forms a gel at room temperature when he adds lithium hydroxide to silica sols at ratios of 4 $SiO_2$:1 $Li_2O$ or higher, and this gel redisperses on standing at room temperature for periods as long as 17 hours. He appears to form these at the concentrations finally desired. The highly hydrated small lithium ion thus has characteristics which make the problems in the preparation of lithium silicate waterglass quite different from those encountered in the production of the usual sodium and potassium silicate waterglasses. This difference has been reviewed at some length by Iler.

In my process I have found that the lithium silicate waterglass solutions may be formed by working a slurry of partially dissolved lithium hydroxide hydrate into a dispersion of silica by wet grinding at 70 to 80° F. until no lumps remain. This process of grinding may take as much as four hours. The final clear product is then concentrated preferably in a vacuum evaporator at about the temperature at which the minimum in the viscosity-temperature curve occurs and at a reduced pressure of about 28–29 inches of mercury in order to avoid forming scale on the surfaces of the evaporator tubes and gelation in the solution itself.

FIGURE 1 shows the viscosity-temperature curve for a lithium waterglass having a 5 $SiO_2$:1 $Li_2O$ ratio and a specific gravity of 1.184. It contained 2.07% $Li_2O$ and 19.9% $SiO_2$. The ordinate gives the viscosity in centipoises while the abscissa gives the temperature in ° F.

It is to be observed that the minimum viscosity is about 53 centipoises and occurs at about 104° F. This, therefore, is the temperature at which the solution should be evaporated. The proper temperature for evaporation for any solution is thus easily determined. The reduction in pressure actually used will depend on equipment available and will govern the rate of concentration.

It is possible to evaporate these solutions at the higher ratios in bulk and by heating at higher temperatures, such as 200° F., but it is difficult to avoid precipitation on the surface of the container and, of course, in commercial applications involving evaporator tubes the difficulty with the formation of scale is much more acute. This may be avoided by controlling the temperature, as stated above.

It is to be understood that in this process a lithium hydroxide solution is equivalent to the slurry or suspension.

My product

The product of my invention may be entirely crystalloidal, and even at ratios of 5 $SiO_2$:1 $Li_2O$, or higher, will have no more than 25% of the total silica in the colloidal form initially, and I prefer to have less than 5% of the total silica present as colloidal silica as determined by the usual colorimetric procedures described in the Iler U.S. Patent 2,668,149. That is at least 75% and preferably 95% of the total silica is in the crystalloidal form. The silica content in the initial solution may be as low as 3% but in the concentrated commercial solutions of my invention may vary from about 5 to 20% at high ratios of 8:1 to about 15% to 30% at 1:1. The preferred ratio of silica to $Li_2O$ may vary from about 2.5:1 to above about 7:1. I prefer solutions in the range of about 4 $SiO_2$:1 $Li_2O$ to 6 $SiO_2$ 1 $Li_2O$ with a gravity of about 15° to 35° Baumé in the lower range and about 10° to 20° Baumé in the higher range. The upper limit of concentration, as in all waterglass technology, is that at which the solution becomes too viscous to handle commercially or, at higher ratios, has too great a tendency to separate a siliceous precipitate. While solutions prepared in the range of ratios of 1:1 to 2.5:1 are stable at room temperature, they rather readily deposit insoluble lithium metasilicate and disilicate on heating. For some purposes this may be desirable.

The crystalloidal silicates of my invention appear to have slightly lower pH than colloidal lithium silicates of the same ratio and concentration.

| Composition | | pH at 25° C. | |
|---|---|---|---|
| Mole Ratio | Percent Solids | Crystalloidal | Colloidal |
| 2.03 | 17.9 | 12.05 | |
| 2.95 | 23.1 | 11.18 | |
| 4.01 | 23.1 | 10.90 | |
| 4.48 | 21.68 | | 10.90 |
| 4.66 | 18.46 | | 10.90 |
| 4.73 | 18.80 | 10.82 | |
| 4.93 | 19.69 | | 10.90 |
| 5.15 | 23.51 | 10.79 | |
| 5.20 | 19.51 | | 10.95 |
| 12.40 | 22.66 | | 10.90 |

EXAMPLES

The following examples are given for the purpose of illustrating the invention and include the best mode contemplated by the inventor for carrying out his invention. They are not to be construed as limiting the invention which is defined in the claims.

Example 1

A silica aquasol with 2.6% of $SiO_2$ was prepared by passing a solution of sodium silicate through a base exchange resin. 2060 lbs. of silica aquasol containing 54 lbs. of $SiO_2$ were mixed with a solution of lithium hydroxide prepared by mixing 15 lbs. of lithium hydroxide monohydrate with 250 lbs. of water. This dilute solution was mixed for 10 minutes with a "Lightnin" mixer in which time the solution had become clear. This solution had a ratio of 5 moles of $SiO_2$ to 1 mole of $Li_2O$ and weighed about 2480 lbs. It was passed through a vacuum evaporator at a rate of 160-250 lbs. per hour at a vacuum of 27-29 inches of mercury and a temperature of 102-112° F. The heat exchanger steam temperature was 165-175° F. By similar procedures, lithium silicate solutions having mole ratios of 3:1 to 6:1 have been prepared.

This lithium silicate has a viscosity temperature curve with a distinct minimum as shown in FIGURE 1. Because of this property it is necessary to hold the temperature during evaporation as close as possible to the temperature of minimum viscosity to avoid gelling and scale deposition on the surface of the tubes of the heat exchanger. The ordinary sodium and potassium waterglasses do not have this minimum in the temperature viscosity curve.

The lithium hydroxide monohydrate was a white, crystalline solid. It came from America Potash Chemical Corp. and had the following analysis:

| | Percent |
|---|---|
| $Li_2O$ | 34.45 |
| $H_2O$ | 44.06 |
| Na(NaOH) | <0.009 |

The finished product, about 200 lbs., of this example had a mole ratio of 5.15 and contained 2.07% of $Li_2O$, 21.44% of $SiO_2$, 76.41% of $H_2O$ and about 0.045% of $Na_2O$, or less, with a trace of $CO_2$, 0.0095% $Fe_2O_3$ and 0.0062% of $TiO_2$. The viscosity was 0.6 poise at 20°, and the specific gravity was 1.198 at 20° C. (24° Baumé).

Crystalloidal silica was 16.08% with 5.24% colloidal silica; that is, 75.5% of the silica present was crystalloidal.

Other products using the same reaction are described in the following table:

| | | |
|---|---|---|
| $Li_2O$, percent | 3.33 | 2.44 |
| Total $SiO_2$ (volumetrically), percent | 19.77 | 19.67 |
| Crystalloidal silica (volumetrically), percent | 19.19 | 19.15 |
| Colloidal silica (difference), percent | 0.58 | 0.52 |
| Mole ratio, $SiO_2/Li_2O$ | 2.95 | 4.01 |

These analyses show that the lithium silicates contained from 97 to 97.5% of the silica in the crystalloidal form as shown by the colorimetric method described in the Iler patent mentioned above. By light scattering methods the particle size of the remaining colloidal silica was found to be about 2 m$\mu$.

Example 2

Solutions of lithium silicate having ratios of 1:1 to 5:1 can be prepared by stirring combinations of lithium hydroxide monohydrate with silica in the form of hydrogen tetrasilicate, hydrated precipitated amorphous silica pigment, such as Hi-Sil 233 from Columbia Southern Chemical Corp., commercial silica gel such as Davison Chemical Corporation Grade #12 (93% $SiO_2$), and hydrous silica gel produced by acidifying and washing alkali metal silicate solutions. The reaction of the lithium hydroxide with the silica is slow in the temperature range of 70 to 80° F. but if the mixtures are treated with agitation at 160-200° F. for from 2 to 5 hours, maintaining the volume constant, almost clear solutions of lithium silicate can be obtained. In the higher temperature region the solutions become almost a slurry containing precipitated material which redissolves on cooling to 70-80° F. if the ratio is above about 2.5.

A lithium silicate solution having a concentration of 19.0° Baumé and a ratio of 5 $SiO_2$ to 1 $Li_2O$ was prepared by forming a slurry of Davison #12 silica gel (1700 grams) having a particle size −28 +200 mesh with 4000 grams of $H_2O$ and mixing with a slurry of lithium hydroxide monohydrate in 3000 grams of water at 140-160° F. for about 4.5 hours. In carrying out this reaction it was found that the use of −200 mesh silica gel did not speed up the reaction and that lithium hydroxide slurry could be added either drop by drop or as a single unit without changing the reaction rate. A minor amount of undissolved residue was filtered off leaving a clear solution. The volume was maintained by periodic replacement of evaporated water.

The product of this reaction contained 0.045% $Na_2O$ by spectrographic analysis. It has a demonstrated shelf life of at least a year. Stability of my products is a function of both ratio and concentration, and products with a 4.1 ratio have been found to be stable for over three years.

A solution formed similarly with a mole ratio of 4.73 contained 1.78% $Li_2O$, 16.48% crystalloidal silica and 0.44% colloidal silica.

Example 3

In this example a 2 $SiO_2$:1 $Li_2O$ ratio solution of crystalloidal silica was prepared by reacting 144 grams of lithium hydroxide monohydrate with 220 grams of Davison's silica gel #12 in 1275 ml. of water at room temperature for about 12 hours. Solutions having gravities varying from 21 to 36° Baumé were obtained by varying the amount of water either in the initial composition or by vacuum evaporation of the product. At 36° Baumé the solution was heated to 40° C. for an hour to complete solution.

Example 4

It is possible to obtain different ratios of these lithium silicates by either dissolving additional silica in the form of a gel or adding additonal lithium hydroxide to a prepared concentrate. For instance, a 4:1 ratio lithium silicate prepared by vacuum evaporation had a gravity of 30.5° Baumé and contained 3.2% of $Li_2O$ and 26.0% of $SiO_2$. A 5:1 ratio lithium silicate was prepared from this by adding to a dilute solution of the above 4:1 ratio silicate a sufficient amount of Davison Gel #12 and agitating the mixture for about 15 hours and then heating to 160° F. for 2 to 3 hours during this period. The final solution was concentrated as desired. On the other hand, lithium hydroxide monohydrate could be added to a 23° Baumé solution at the 4:1 ratio to form a 2:1 ratio lithium silicate. A white floc precipitate first formed but dissolved on further stirring when the gravity was less than 20° Baumé. This final solution could be evaporated as desired.

Example 5

A 1:1 ratio lithium silicate was prepared by stirring 144 grams of lithium hydroxide monohydrate with 110 grams of Davison's Silica Gel #12 in 1275 ml. of water at room temperature for about 12 hours. A solution at 13° Baumé was obtained containing 3.06% of lithium oxide and 12.5% of $SiO_2$. This solution could be evaporated only at low temperatures. Vacuum evaporation at higher temperatures formed a floc which did not redissolve on cooling.

Example 6

A solution of lithium hydroxide was formed containing 5% of $Li_2O$. To 54.60 grams of this solution was added 20.66 grams of silicic acid containing 8.5% of $H_2O$ from Mallinckrodt Chemical Works and an additional 24.74 grams of water. A somewhat opalescent solution formed when this mixture was heated and any undissolved suspended material was allowed to settle out. The final solution had a mole ratio of 1 $Li_2O$:3.45 $SiO_2$ and contained 0.912 moles of silicate solid per thousand grams of solution. This solution of crystalloidal lithium silicate was compared with a crystalloidal potassium silicate solution, "Kasil 22," sold by Philadelphia Quartz Co., having a weight percent ratio of 1 $K_2O$ to 2.2 $SiO_2$ and a mole ratio of 1 $K_2O$ to 3.45 $SiO_2$. It contained about 8.6% $K_2O$ and 18.9% $SiO_2$. It was found that the best results were obtained in both cases with molecular ratios of silicate to barium acetate of about 10.2 to 1.

A general method of determining screen strengths by an adhesion test is described by J. Fred Hazel and George L. Schnable in J. Phys. Chem. 58,812 (1954). In this example the test was carried out with clean 400 ml. Pyrex glass beakers using 0.2 gram of phosphor for each screen or 4 milligrams per sq. centimeter of screen area. The solution in which the phosphor is dispersed is called the "cushion" and 250 ml. of cushion was used with each beaker. The cushion is made up from dilute solutions of the alkali silicate and reagent grade barium acetate. In preparing the cushion, about 200 ml. of water is placed in the beaker and the amount of barium acetate solution necessary to give the stated parts per million concentration in the final solution is added. Following this, the dilute potassium silicate is added with the phosphor suspended therein and the final volume is adjusted to 250 ml. The cushion is thoroughly agitated and then the beaker is allowed to stand undisturbed for the stated length of time and then tested for wet adhesion. In this test of wet-screen strength, water is allowed to flow through an orifice of 0.65 millimeter placed exactly 1 centimeter from the wet screen surface and under a head of 100 centimeters of water. This stream of water is allowed to flow through the cushion against the screen for 5 seconds and the diameter of the hole is measured. This measurement is made after removal of the cushion and may be made either with a template having standard size holes or with a calibrated rule.

The best results were obtained with the potassium silicate at 6000 p.p.m. concentration and 500 p.p.m. of barium acetate. This is a molecular ratio of 10.2 to 1. For the lithium silicate, the best concentration was, again, at the same molecular ratio, that is 4735 p.p.m. of lithium silicate and 500 p.p.m. of barium acetate. The wet screen test after 30 minutes showed a diameter of 6 mm. for the potassium silicate and only 3.5 mm. for lithium silicate.

The screen may be dried and baked and further tested in a similar way impinging the stream of water on the inverted screen. In this test for dry screen strength at 25 p.s.i.g. pressure the potassium silicate screen had a hole diameter of 13 mm. compared to 1 for the lithium silicate and, in fact, this size difference held for a wide range of lithium silicate barium acetate concentrations and water pressure.

Example 7

When used as adhesives for corrugated paperboard, crystalloidal lithium silicates having a mole ratio of about 3 $SiO_2$ to 1 $Li_2O$, or higher, form dry bonds which are the approximate equivalent to those formed by similar sodium silicates, but after soaking in water for half an hour the bonds are appreciably stronger. Since the lithium silicate solutions were somewhat low in solids and thus had a low viscosity, 20% Barden clay was added and found to affect the bonds beneficially.

In this example, adhesive A was a lithium silicate solution having a mole ratio of 4.74 $SiO_2$ to 1 $Li_2O$ with 16.92% $SiO_2$ prepared by the method of Example 2. This solution had a viscosity at 24° C. of 0.18 poise. The viscosity was determined with a Brookfield viscometer using the No. 3 spindle at 50 r.p.m.

Adhesive B was formed with 80% of A and 20% of Barden clay fairly dispersed. The viscosity was 1 poise.

Adhesive C was a lithium silicate solution with 2.96 moles of $SiO_2$ to 1 of $Li_2O$ and containing 19.77% $SiO_2$ formed by the method of Example 1. The viscosity was 0.2 poise.

Adhesive D was prepared from 80% of Adhesive C with 20% Barden clay, which is primarily a fine kaolin clay from North Carolina which has not been water-washed.

Adhesive N was the N sodium silicate of the Philadelphia Quartz Co. having a mole ratio of about 3.3 $SiO_2$ to 1 $Na_2O$ with 28.7% $SiO_2$, and a viscosity of 1.5 poises.

In these tests, B-flute corrugated board specimens were bonded with each of the adhesives and conditioned overnight at 73° F. and 50% relative humidity. The bonds were formed by joining kraft liner to single face bogus medium using a 0.013 inch glue spreader. The liner was preheated on a 280° F. hotplate and the bond was set by heating the bonded specimens for 10 seconds on the same hotplate. The bond strengths listed are those for 12 inch of flute glue line, and the fiber tear is an estimated percentage of the area of the specimens tested. The testing procedure was that of TAPPI method RC–269.

| Adhesives | Bond Strength/Tear | |
|---|---|---|
| | Dry | Soaked ½ hour |
| A | 33/0 | 0.77/0 |
| B | 34/1 | 1.19/0 |
| C | 48/40 | 0.38/0 |
| D | 53/90 | 0.26/0 |
| N | 47/50 | 0.04/0 |

Example 8

Zinc-rich coatings for iron were prepared using the crystalloidal lithium silicates of my invention, and the colloidal lithium silicates described by McMahon et al. in U.S. Patent 3,130,061. In these simple tests the zinc dust, known as AA1, sold by General Smelting Co., and having an average particle size of 9 microns with 97.0% zinc, 2.85% zinc oxide and 0.1% of lead, was mixed with the binder and brushed onto a clean iron surface. After drying for one hour, the coatings were tested for adhesion, using a Hoffman Scratch-Hardness Tester, and then they were soaked in water and the adhesion tested by rubbing with the fingers.

It will be noted that definite differences were found in the results. The colloidal silicate blistered when tested for water resistance after drying for one hour and could be easily removed by rubbing, whereas the crystalloidal silicate binder formed a coating which could be rubbed off only very slightly in the same test. The adhesion strength, after drying one hour, appeared to be the same, and both were dry to the touch in between 5 and 10 minutes.

The crystalloidal silicate at 4.0 mole ratio with 19.9% of $SiO_2$ was made according to the method of Example 1. Twenty ml., or 24 grams, was mixed with 65 grams of zinc dust according to my standard testing procedure, and after drying for one hour the adhesion measured in grams with the Hoffman Scratch-Hardness Tester was 800 grams. Following the scratch test, the coated specimen was placed in a beaker of water for 5 minutes and then rubbed to test the adherence of the coating. Even with hard rubbing only very little of the coating could be rubbed off with the fingers.

A colloidal sol was prepared according to the method of McMahon et al. in U.S. Patent 3,130,061. It had a mole ratio of 4.2 $SiO_2$ to 1 of $Li_2O$ and contained 20.8% of $SiO_2$. Following the directions of McMahon, 90 grams of the zinc dust was mixed with 28.4 grams of the binder, brushed onto a clean iron surface, and allowed to set for 1 hour. It also had an adhesion test of 800 grams but after soaking for 5 minutes the coating blistered and could be rubbed off easily. Thus it is evident that the colloidal silica did not form a water-resistant bond in 1 hour whereas the crystalloidal silicate did form a water-resistant bond in that short period. This is very important in commercial applications where the paint film may be exposed to the weather and early development of water-resistance is highly desirable.

Uses

I have found that these crystalloidal solutions of lithium silicate of my invention are unusually well suited as binders for phosphors on television screens, for sealing porous aluminum and other metal castings for use at very high temperatures and pressures, and as binders in metal powder corrosion-resistant coatings for iron, etc. They are also useful in enamel coating formulations, welding rod coatings, and as water-resistant adhesives for paper and plywood. They also have peculiar properties as humectants, and the dried film has specific electrical characteristics.

More or less detailed claims will be presented hereinafter, and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine non-inventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents as well as changed proportion of the ingredients which do not render the composition unsuitable for the disclosed purposes. Therefore, this application for Letters Patent is intended to cover all such modifications, changes and substitutions as would reasonably fall within the scope of the appended claims.

What I claim is:
1. An aqueous lithium silicate solution characterized by:
   (a) a concentration within the range of between 5° and 40° Baumé,
   (b) a $SiO_2:Li_2O$ mol ratio within the range between 2.5:1 and 8.0:1, and
   (c) at least 75% of the silica present is in the crystalloidal form with any colloidal particles present having a maximum size of 2 millimicrons.
2. A solution according to claim 1 wherein said mol ratio is within the range between 4:1 and 6:1.
3. Coating compositions comprising the lithium silicate solutions of claim 1 with metallic powders of the group of Zn, Al, Zr, Pb.
4. A solution according to claim 1 where 95% of the silica is in the crystalloidal form.
5. A method for producing an aqueous lithium silicate solution which comprises:
   (A) admixing together
      (1) water
      (2) a lithium hydroxide material, and
      (3) a silica material selected from the group consisting of silica sols, silica pigments, and silica gels, said admixture having a colloidal silica content between 3 and 30% and a gravity of between about 10° and 35° Baumé, and thereafter
   (B) heating said admixture under evaporating conditions at about the temperature at which the minimum in the viscosity-temperature curve occurs to form a solution of lithium silicate waterglass which is characterized by
      (a) a concentration within the range of between 5% and 40° Baumé,
      (b) a $SiO_2:Li_2O$ mol ratio within the range of 2.5:1 and 8.0:1, and
      (c) at least 75% of the silica present is in the crystalloidal form with any colloidal particles present having a maximum size of 2 millimicrons.
6. A method according to claim 5 wherein said mol ratio is within the range of 4:1 and 6:1.
7. A method according to claim 5 wherein the heating under evaporating conditions is carried out under vacuum.

(References on following page)

References Cited

UNITED STATES PATENTS

| | | | |
|---|---|---|---|
| 2,668,149 | 2/1954 | Iler | 252—313 |
| 2,765,237 | 10/1956 | Drummond | 106—84 |
| 2,921,863 | 1/1960 | Selby | 252—301.4 |
| 2,933,371 | 4/1960 | Alexander et al. | 252—301.4 |
| 3,130,061 | 4/1964 | McMahon | 106—84 |
| 3,180,746 | 4/1965 | Patton et al. | 106—84 |
| 3,180,747 | 4/1965 | Patton et al. | 106—84 |
| 3,214,287 | 10/1965 | Mosan | 106—74 |

OTHER REFERENCES

Vail: Soluble Silicates, vol. 1, 1952, Reinhold Pub. Corp., New York, pages 16, 17, 116, 130.

TOBIAS E. LEVOW, *Primary Examiner.*

S. E. MOTT, *Assistant Examiner.*

UNITED STATES PATENT OFFICE
CERTIFICATE OF CORRECTION

Patent No. 3,392,039                                              July 9, 1968

Frank L. Cuneo, Jr.

It is certified that error appears in the above identified patent and that said Letters Patent are hereby corrected as shown below:

Column 1, line 25, after "maximum" insert -- size --; lines 31 and 32, cancel "at which separation", second occurrence; line 68, "silca" should read -- silica --. Column 3, line 34, after "$SiO_2$", second occurrence, insert a colon. Column 6, line 72, "N", second occurrence, should read -- "N" --. Column 8, line 24, "proportion" should read -- proportions --; line 63, "5%" should read -- 5° --; line 69, "crons." should read -- crons, said lithium hydroxide and silica material being employed in amounts sufficient to provide a product having the properties set forth in (a) and (b) --. Column 10, line 2, "Mosan" should read -- Mosna --.

Signed and sealed this 30th day of December 1969.

(SEAL)
Attest:

EDWARD M.FLETCHER,JR.                      WILLIAM E. SCHUYLER, JR.
Attesting Officer                                Commissioner of Patents